Oct. 21, 1969  D. W. FORRANT  3,474,242

PHOTOGRAPHIC RING LIGHT

Filed Oct. 14, 1966

INVENTOR.
DAVID W. FORRANT
BY Kenway, Jenney
& Hildreth
ATTORNEYS

United States Patent Office 3,474,242
Patented Oct. 21, 1969

3,474,242
PHOTOGRAPHIC RING LIGHT
David W. Forrant, Box 1023, Acton, Mass. 01720
Filed Oct. 14, 1966, Ser. No. 586,866
Int. Cl. G03b 15/02
U.S. Cl. 240—1.3                                    8 Claims

ABSTRACT OF THE DISCLOSURE

A photographic flash unit having a trough-like casing, a ring of transparent light transmitting material mounted in the trough, and a light shielding device interposed between a gap formed in the light transmitting ring. The casing is attached to the camera so that it surrounds the camera lens and a flashlamp is mounted in a socket disposed within the gap of the ring for illuminating the ring to thereby cause the ring to project light forwardly of the camera. The light shield has an opaque segment in one portion thereof and a translucent segment in another portion whereby a controlled amount of light is transmitted from the flashlamp to the ring.

My invention relates to a light source for photography. In particular, my invention comprises a passive ring light which is activated by a conventional flash source for close-up photography.

Ring lights are useful instruments which serve as virtually shadow-free sources of illumination for pictures taken at relatively short distances. Conventional photo-flash light sources, when used by themselves at short distances from the subject being photographed, generally cause overexposure of the film and create heavy shadows on the subject. To avoid these problems, photo-flash sources known as ring lights have been developed. These ring lights as presently constituted, comprise a continuous photo-flash tube formed in a circular shape and adapted to be mounted on a camera so as to encircle the lens of the camera and thereby provide a source of nearly constant illumination around the periphery of the lens. In ring lights of this type, each section of the flash tube serves as an active emitter of light, since the gas with which these tubes is generally charged ionizes throughout the entire length of the tube when fired.

Photo-flash units of this type may be said to be "active" ring lights in that light is generated at each point in the tube. Ring lights of this type are generally difficult to produce and are therefore expensive, as well as being fragile in nature. Further, due to the extended nature of the light source, power supplies of greater capacity, and therefore greater weight, are usually required to operate the light source.

I have found that a simple yet efficient ring light may be formed from a passive light transmitting element utilized in conjunction with a photo-flash source of conventional type, these sources including flash bulbs, electronic flash lamps, and other common sources of high-intensity illumination. This type of light may be considered to be a "passive" ring light in that light is generated at one segment only of the ring, this light being transmitted around the ring and reflected outwardly in a circular pattern by the ring itself. "Passive" ring lights made in accordance with my invention are generally lighter in weight, require a power supply with smaller capacity than conventional power supplies for active ring lights, and are generally simpler and less costly to produce. In addition, ring lights of this type more readily lend themselves to the control of the amount of illumination to be supplied to the subject and are especially useful for photographing subjects at very close ranges, i.e. of the order of two to twenty-five inches.

Accordingly, it is an object of my invention to provide an improved light source for photography. Further, it is an object of my invention to provide an improved light source which may be utilized in connection with conventional photo-flash sources to provide a nearly constant circular illumination for photographing subjects at close range. Another object of my invention is to provide a passive ring light in which the intensity of the illumination applied to the ring may readily be controlled.

One feature of my invention resides in the provision of a compact enclosure for the ring light by which the ring and its associated power supply may readily be mounted on a camera. Another feature of my invention resides in the provision of a protective element for the ring light which may serve the additional duty of controlling the amount of illumination to be admitted to the ring.

The above and other and further objects and features of my invention will become more readily apparent when taken in conjunction with the following detailed description of the drawings in which.

Figure 1:
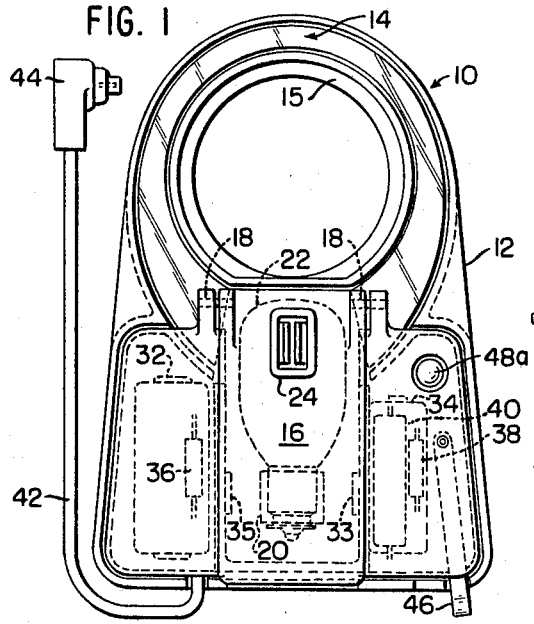
FIG. 1 is a front elevational view of a ring light made in accordance with my invention, with portions of the electric circuitry shown in phantom.
Figure 2:
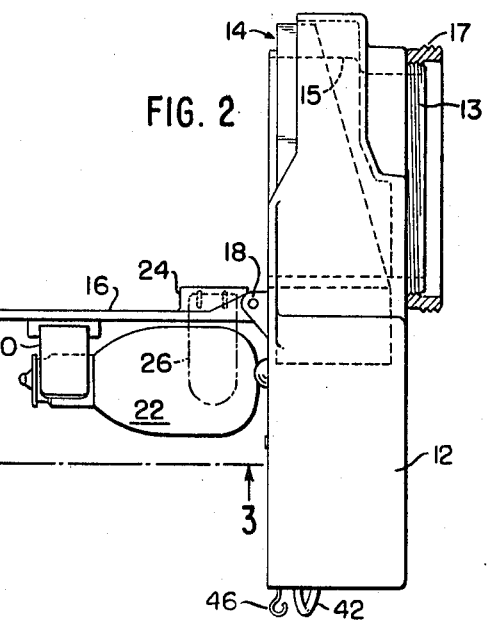
FIG. 2 is a side elevational view of the photo-flash unit of FIG. 1 with the front cover shown in open positions.
Figure 3:
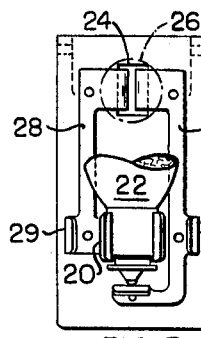
FIG. 3 is a planar view of the rear face of the front cover taken along the lines 3—3 of FIG. 2 and showing the bulb mounting elements in more detail.

In FIGS. 1 through 3 of the drawings, there is shown a photo-flash unit 10 comprising a casing 12 having a generally circularly shaped light transmitting element or ring 14 mounted within a trough formed by the outer wall of casing 12 and the inner circular portion 15; a threaded ring 13 is formed on the rear outer surface of the tubular portion 15. A standard filter adapter ring 17 is threaded around the ring 13 as may be seen most clearly in FIG. 2 of the drawings. The ring 14 may be formed from glass or other translucent material but is preferably formed from a light-weight translucent plastic material such as Lucite, a registered trademark of the E. I. du Pont de Nemours Co. for an acrylic resin. The ring has a tapering thickness, varying from a minimum near the top of the ring to a maximum near the bottom, and has an interrupted segment with generally opposed faces near the bottom of the ring to accommodate a light source. Mounted on the lower part of the casing is a cover 16 which is hinged about pivots 18 for swinging movement. The door 16 carries a mounting clip 20 for a light source, shown in FIG. 1 as a flash bulb 22, in the lower portion of the door and a mounting clip 24 for an additional light source, also shown as a flash bulb 26, in the upper portion of the door. Either one of the bulbs 22 or 26 may be used as desired, depending on the desired light intensity; both bulbs are not, however, used simultaneously. The bulb 22 may be an M3 bulb or its equivalent while the bulb 26 may be an AG3 bulb or its equivalent. As shown, these bulbs are positioned at right angles to each other to allow them to fit within the interrupted segement in the lower portion of the ring 14.

A bus bar 28 (shown in FIG. 3) provides an electrical connection between one portion of the mounting clip 24 and the mounting clip 20, the clip 20 serving as a first electrical contact for the bulb 22; a bus bar 30 is connected to the other portion of the mounting clip 24 and serves as a second electrical contact for the bulb 22. The bus bars 28 and 30 have resilient spring clips 29 and 31 extending from their sides; the clips 29 and 31 make electrical contact with the resilient side grips 33 and 35 when the cover 16 is closed and may additionally serve as spring means to secure the cover in the closed position. Other types of closure means for the cover may be utilized if desired.

Also enclosed in the lower half of the casing are batteries 32 and 34, resistors 36 and 38, and a capacitor 40. An electrical cord 42 containing a pair of lead wires and a plug 44 is connected between the flash-trigger on the camera (not shown) and the above circuitry. A two-way switch 46 operates a light bulb 48 mounted on the casing. The interconnection of these electrical components will be explained in more detail in connection with FIG. 8 of the drawings.

In operation, the unit 10 is secured to a camera (not shown) by means of the adapter ring 17. When so secured, the front surface of the ring 14 is parallel to the focal plane of the camera and perpendicular to the optical axis of the camera. It will be apparent that the adapter rings of any desired size may be utilized to suit the desired application.

Figures 4, 5:
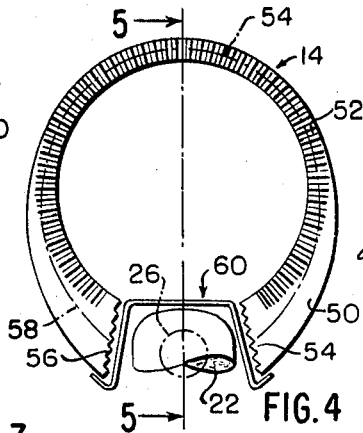
FIG. 4 is a rear elevational view of the light transmitting element of FIG. 1.
FIG. 5 is a side sectional view of this element taken along the lines 5—5 of FIG. 4.

FIG. 4 is a rear elevational view of the light ring of FIG. 1 removed from its casing. The ring 14 has front and rear faces 48 and 50 respectively, and has a series of serrations 52 extending generally in a radial direction on the rear face 50 of the ring. These serrations extend fully across the width of the ring in the upper portion but extend only partially across the width of the ring in the lower portion which is of increased width to allow a maximum transmission of light from the light source to the ring. As shown in the drawing, the width of the serrations thus extends substantially uniformly around the inner circumference of the ring, thus permitting a substantially even emission of light from the ring at all portions of the ring. The lower portion of the ring 14 has an interrupted segment or gap between end faces 54 and 56 for receiving the flash bulbs 22 or 26 therein when the cover 16 of the casing is in closed position. The end faces 54 and 56 are not cut along a radial line but instead are positioned at an angle with respect to the mean diameter 58 of the ring and are themselves serrated such that one face of each of the sawtooth serrations is perpendicular to the mean diameter of the ring. This allows light from the bulbs 22 and 26 to enter the faces 54, 56 of the ring at substantially a right angle while maintaining these faces close to the light source. A shield 60 is positioned between the end faces 54, 56 and the flash bulbs 22 or 26. The shield protects the end faces from blackening or burning due to firing of the bulbs 22 or 26 and also provides a convenient means of controlling the amount of illumination supplied to the ring 14 as will be explained in more detail below.

FIG. 5 is a side cross-sectional view of the ring 14 along the lines 5—5 of FIG. 4. As may be seen from the drawing, the rear face 50 is inclined at an angle with respect to the front face 48. The serrations 52, which may be cut, molded or otherwise formed into the face 50, have a sawtooth shape, with one surface of the tooth extending at approximately a 45° angle to the face 48. Due to the slant of the rear face and the provision of angled serrations on its surface, light which enters the ring in a direction perpendicular to the faces 54 and 56 and which travels along the ring parallel to the face 48 impinges on the serrations 52 and is reflected outwardly approximately perpendicular to the front face 48. Light which enters the ring at other than a right angle to the faces 54 and 56 may be reflected from other surfaces before impinging on the serrated surfaces and will strike the serrated surfaces at other than a 45° angle; the reflected light rays will then be directed outwardly at various angles through the face 48. Due to the decreasing thickness of the ring 14, some light rays will travel only a short distance before impinging on the serrations 52 and being reflected, while other will travel to the top of the ring before being reflected. By making the thickness of the ring at the upper portion relatively small, almost all the light transmitted to the ring by the flash bulb will hit the rear face at one point or another and will thus be reflected outwardly through the front face 48.

Figures 6, 7:
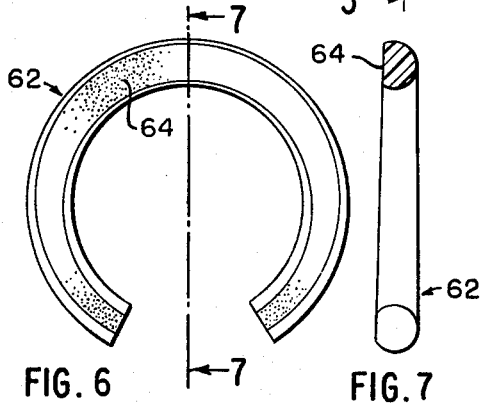
FIG. 6 is a rear elevational view of an alternative form of light transmitting element.
FIG. 7 is a cross-sectional view of this element taken along the lines 7—7 of FIG. 6.

FIGS. 6 and 7 show an alternative form of light ring which is suitable for use in my invention. The ring 62 which may be made of Lucite, glass or other translucent material, comprises a torus having an interrupted segment in the bottom portion thereof for placement of the light source. The rear surface 64 of the ring is flattened and roughened or otherwise pitted to provide a suitable diffusing surface for light rays and is formed to have a decreased thickness toward the upper portion of the ring in a similar manner as the ring of FIGS. 4 and 5. The width of the roughened portion of the rear surface increases from a minimum adjacent to the interrupted segment to a maximum farthest away from this segment. It is believed that this feature of the alternative embodiment shown in FIGS. 6 and 7, although desirable, is not necessary and that useful results may be obtained with this embodiment even in the absence of a tapered width. It will be noted that the functioning of both the light ring shown in FIG. 4 and that shown in FIG. 6 depends at least partially on internal reflection for distribution of the light throughout the ring. In the light ring shown in FIG. 4, however, the inclined rear face intercepts a substantial portion of the light traveling through the ring and thus reflects this light directly through the front face at approximately a right angle to the face. In the light ring shown in FIG. 6, on the other hand, the light may be reflected internally from several surfaces before impinging on the roughened rear face 64.

Figure 8:
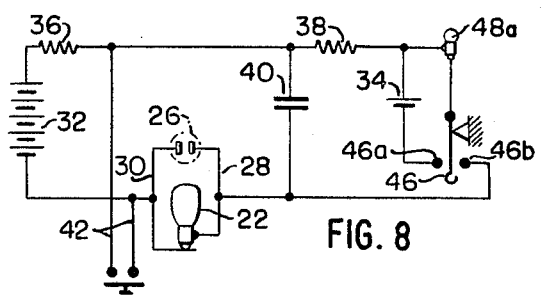
FIG. 8 is a schematic diagram of the electric circuitry for firing the photo-flash unit.

FIG. 8 is a schematic diagram of appropriate electrical circuitry for firing the photo-flash bulbs. The battery 32 is connected in series with the resistor 36, the capacitor 40, and the flash bulb 22 or 26, the contacts for which are connected in parallel by means of the bus bars 28 and 30. Also connected across the capacitor 40 is a test and illumination circuit comprising the resistor 38, the test bulb 48a, and the switch 46. The battery 34 is connected between the bulb 48a and one terminal 46a of the switch 46. The other terminal 46b of the switch 46 is connected to the lower end of the capacitor 40. Through cable 42, a switch in the camera is connected across the battery 32 and the resistor 36 and also across the capacitor 40 and the flash bulb 22 or 26.

The operation of the electrical circuitry is as follows: When a light source such as a flash bulb 22 or 26 is positioned in the holders 20 or 24, the battery 32 charges the capacitor 40 through the resistor 36 and the flash bulb 22 or 26. Since it is desirable to obtain an indication that the circuit is functioning properly, the test bulb 48a is placed in series with the resistor 38 and a switch 46 across the capacitor 40. When the switch arm 46 is momentarily brought into contact with the switch terminal 46b, the capacitor 40 is allowed to discharge through the resistor 38 and the light bulb 48a; the purpose of the resistor 38 is to limit the discharge current through the bulb 48a. If the capacitor 40 has been properly charged, it will quickly discharge through the resistor 38 and the bulb 48a and this discharge will cause a brief illumination of the bulb 48a. If, on the other hand, the capacitor 40 has not been properly charged due to a defect in the capacitor itself or to an open circuit in the bulb 22 or 26 or due to the condition of the battery 32, the defect will be manifested by the failure of the bulb 48a to flash when the switch 46 is momentarily closed.

When working at close distances, it is often desirable to provide an auxiliary source of light to assist in focusing the camera and arranging the subject. A convenient means of providing this illumination is shown in FIG. 8 in which the battery 34 is placed in series with the bulb 48a when the switch arm 46 is moved to the terminal 46a, thereby illuminating the bulb 48a.

Figure 9:
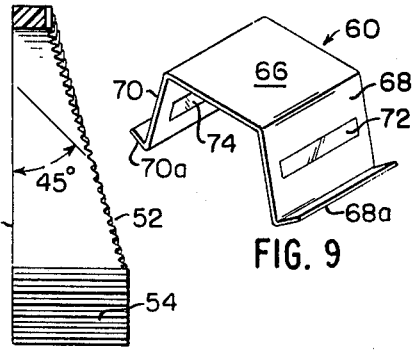
FIG. 9 is a pictorial view of a light adjusting and protecting elements used in conjunction with the photo-flash unit.

FIG. 9 shows the shield 60 of FIG. 4 in more detail. The shield 60 has an upper surface 66 and side walls 68 and 70, these walls having integral flanges 68a and 70a respectively. Formed in the side walls 68 and 70 are translucent segments 72 and 74 respectively extending transversely along the side walls. The upper surface 66 and the side walls 68 and 70 are opaque, and may be either reflecting or absorbing surfaces. The segments 72 and 74, on the other hand, are translucent so that, when positioned as shown in FIG. 5, light from the flash bulbs 22 or 26 may pass through these segments into the light ring 14. The dimensions of the segments 72 and 74 will be dependent upon the size and type of flash bulb used and on the amount and intensity of the illumination it is desired to supply to the ring 14. If pictures are to be taken at several different distances, or with photographic films of different sensitivity, it will be found desirable to utilize interchangeable shields having openings of different sizes to vary the amount and intensity of the light transmitted to the ring 14. Alternatively, shields 60 of differing opacity may be utilized to control the light admitted to the ring. The shield 60 also serves to protect the end faces 54 and 56 of the ring from blackening or pitting due to firing of the flash bulbs.

It will be apparent that various changes may be made in the above construction without departing from the scope and spirit of my invention. For example, the rear surface of the ring shown in FIG. 4 may be roughened or pitted by etching, sand blasting or other methods of treatment instead of being serrated. This may change the quality of the illumination somewhat as compared with that obtained with the construction shown in FIG. 4 since it is expected that a lesser percentage of light will be directed through the front surface at right angles; the illumination should still be satisfactory for most purposes, however.

Various changes in the method of introducing light into the light ring may also be made without departing from the scope of my invention. Thus, the interrupted segment shown at the bottom of the light ring may, in some cases, be replaced by a recessed segment or by a cavity in the ring of sufficient size to couple light into the ring from a given source.

From the above it may be seen that I have provided an improved photographic light source of the ring light type. Further, I have provided an improved ring light which utilizes conventional photo-flash bulbs and in which the intensity of the illumination supplied by the ring may readily be controlled.

Having described and shown a preferred embodiment of my invention, what I claim as new and desire to secure by Letters Patent is:

1. A compact ring-type photo-flash unit for a camera, said unit comprising a casing having an open circular trough portion having radially spaced inner and outer walls and adapted to be mounted coaxially of the camera lens with the open side on the trough portion facing outwardly along the lens axis, said inner wall portion of the trough being disposed radially outwardly beyond the field of view of the camera lens, a ring of solid transparent light transmitting material having a high index of refraction disposed within the trough around the camera lens and shielded from said lens by the trough, the ring having a gap to provide spaced opposed faces at the ring ends, a photographic flash lamp light source mounted between said opposed faces of the ring, and electric circuit means for activating said light source to cause said source to provide illumination to the ring when said source is energized.

2. The combination defined in claim 1 in which the ring increases in thickness in the vicinity of the light source both in radial dimension and in a dimension parallel to the lens axis whereby an increased amount of light is coupled from the light source into the opposed spaced end faces of the ring.

3. The combination defined in claim 1 in which the ring has a rear face having a plurality of serrations, said serrations serving as individual reflecting surfaces for the light transmitted through said ring from said source, said surfaces being positioned at approximately 45° to said light whereby said light may be reflected from said surfaces forwardly of the ring.

4. The combination defined in claim 1 in which the spaced opposed ends of the ring have serrated faces.

5. The combination defined in claim 1 in which the casing includes means for selectively positioning one of first and second photographic flash lamp sources of different sizes between the opposed end faces of the ring, said means providing that the longitudinal axis of one size of flash lamp when in position is perpendicular to the longitudinal axis of a lamp of a different size when it is in position.

6. The combination defined in claim 5 in which said means for selectively positioning said photographic flashlamp sources comprises a cover hingedly attached to said casing and having a pair of mounting clips electrically connected in parallel for accommodating light sources of different size, said cover being movable to an open position to mount a selected light source in said clips and being movable to a closed position to couple said light source to said ring.

7. The combination defined in claim 1 in which said photo-flash unit includes a shield removably interposed between the light source and the end faces of said light transmitting ring, said shield having light control means for admitting a controlled amount of light to the end faces of said ring.

8. The combination defined in claim 7 in which the light control means of said shield has an opaque segment in one portion thereof and a translucent segment in another portion thereof adjacent said ring whereby a controlled amount of light is readily transmitted from said source to said ring through said translucent segment.

References Cited
UNITED STATES PATENTS

| | | | |
|---|---|---|---|
| 2,314,829 | 3/1943 | Hunter | 95—11.5 |
| 2,360,663 | 10/1944 | Eddy. | |
| 2,515,437 | 7/1950 | Bisch et al. | |
| 2,682,603 | 6/1954 | Dine et al. | 240—1.3 |
| 2,760,048 | 8/1956 | Schulte | 240—1.3 |
| 3,040,168 | 6/1962 | Stearns. | |
| 3,137,447 | 6/1964 | Dorman. | |

NORTON ANSHER, Primary Examiner

FRED L. BRAUN, Assistant Examiner

U.S. Cl. X.R.

240—1